Feb. 4, 1947.    H. KATTWINKEL    2,415,100
DEVICE FOR CONTROLLING THE BRAKE ACTION IN RAILWAY CARS AND THE LIKE
Original Filed Jan. 22, 1938    5 Sheets-Sheet 1

Inventor
H. Kattwinkel
By
Glascock Downing Seebold
Attorneys.

Feb. 4, 1947.  H. KATTWINKEL  2,415,100
DEVICE FOR CONTROLLING THE BRAKE ACTION IN RAILWAY CARS AND THE LIKE
Original Filed Jan. 22, 1938  5 Sheets-Sheet 2
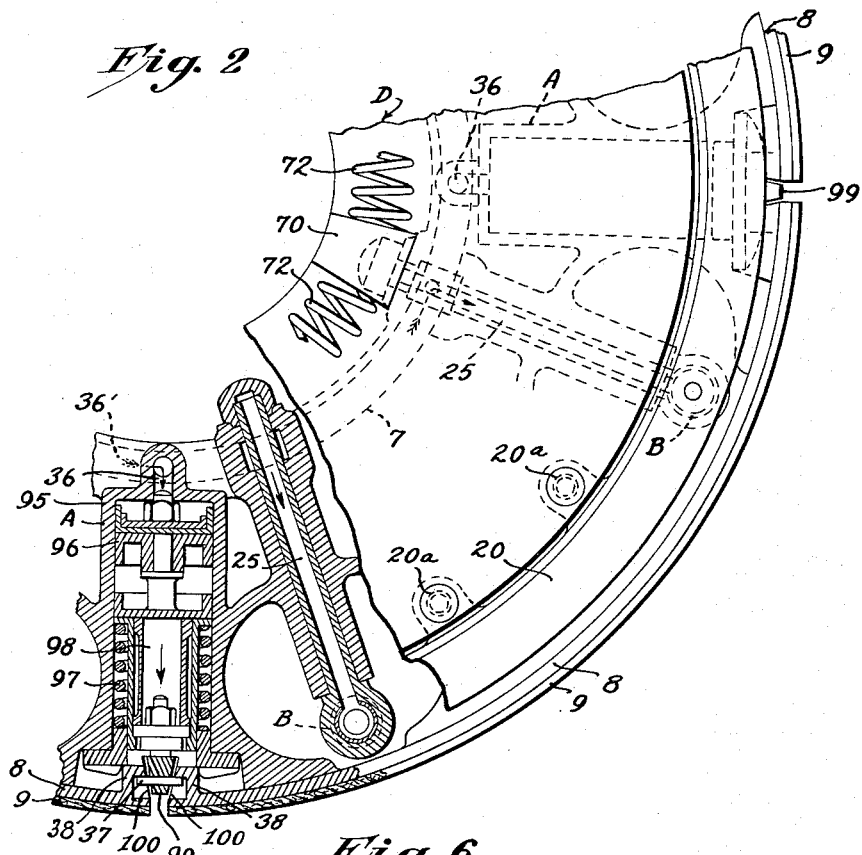
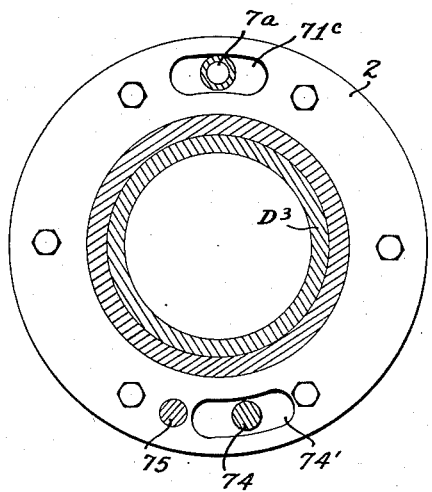
Inventor
HANS KATTWINKEL
By Am. Holcombe.
Attorney

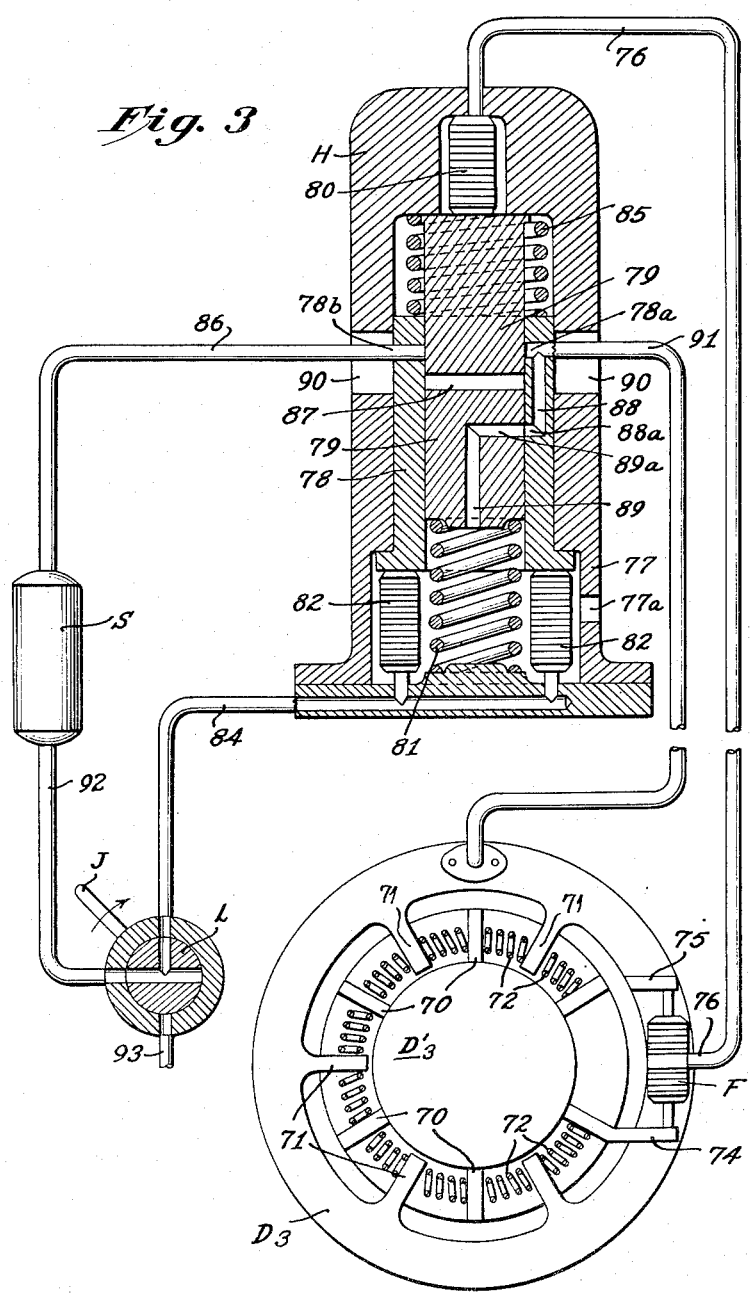

Feb. 4, 1947.   H. KATTWINKEL   2,415,100
DEVICE FOR CONTROLLING THE BRAKE ACTION IN RAILWAY CARS AND THE LIKE
Original Filed Jan. 22, 1938   5 Sheets-Sheet 4

Inventor
HANS KATTWINKEL
By A. M. Holcombe
Attorney

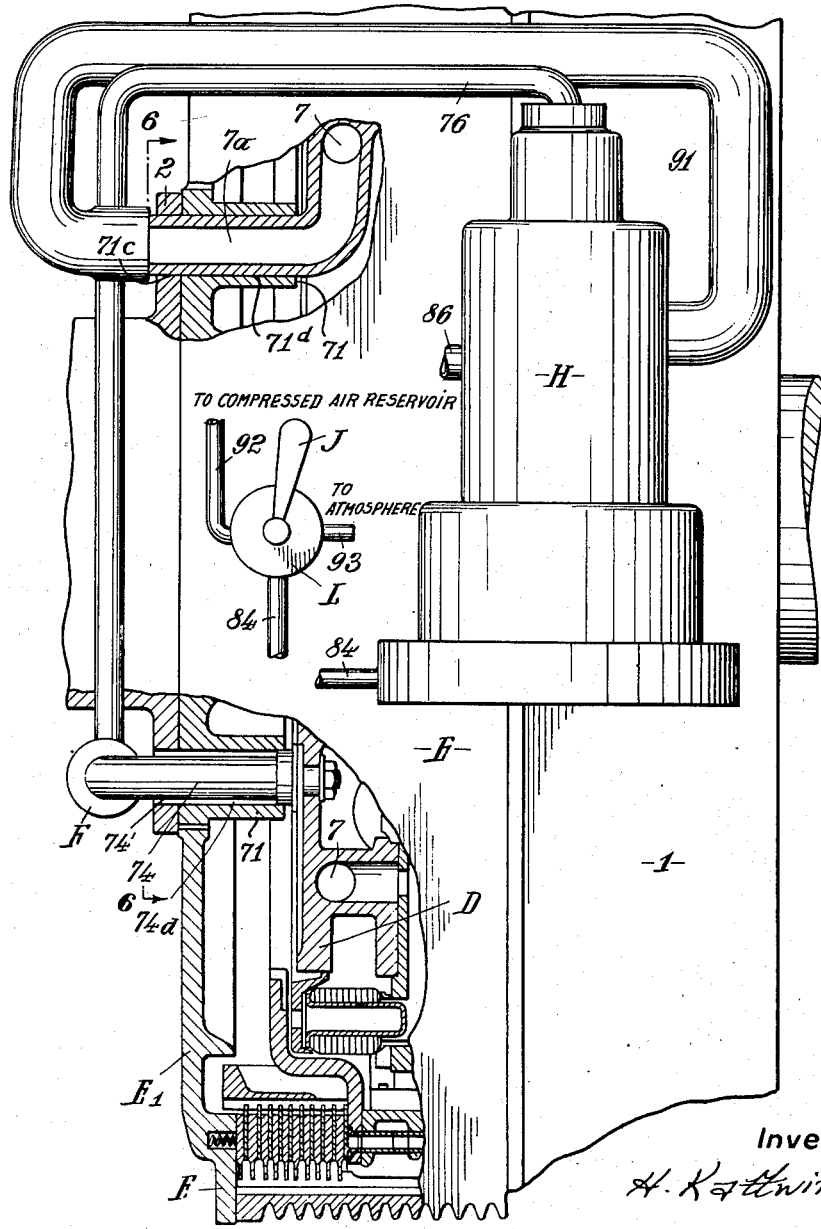

Patented Feb. 4, 1947

2,415,100

UNITED STATES PATENT OFFICE 2,415,100

DEVICE FOR CONTROLLING THE BRAKE ACTION IN RAILWAY CARS AND THE LIKE

Hans Kattwinkel, Radebeul, Germany; vested in the Alien Property Custodian

Original application January 22, 1938, Serial No. 186,461. Divided and this application February 28, 1941, Serial No. 381,146. In Germany January 28, 1937

5 Claims. (Cl. 303—21)

The present application is a divisional of applicant's preceding application 186,461 filed January 22, 1938, now Patent Number 2,239,459 dated April 22, 1941.

It is known that when, on braking railway trains, the speed of the train decreases after the commencement of the braking action, as does, therefore, also the sliding speed at the friction surfaces of the brakes, the coefficient of friction and, thus, also the brake action increases. This takes places in an extraordinarily strongly increasing measure before the train concerned comes to a standstill, so that if the pressure forcing the friction bodies pressed against one another would remain constant the car wheels would be blocked and the train, moreover, come to a standstill with an undesired jerk. The chief conductor is not in the position to obviate that at all events in that he lacks, when actuating the control device for the brakes, completely any feeling for the actually effected brake action which depends not only upon the position of the brake control lever, but also upon the coefficient of friction which as mentioned above varies with the friction speed. The chief conductor does not know, therefore, at which point of time and in which measure he must adjust the brake lever to a lower brake action when the speed of the train decreases.

It has already, for the purpose of preventing the so-called blocking of the wheels of railway cars, as takes place in consequence of too strong braking, been suggested to make the brake pressure automatically dependent on factors connected with the actually arising brake action, as, for instance, on the state of motion of the braked wheel or on the speed of the respective train, as well as on the pressure existing in the brake cylinders.

The known devices hitherto suggested do not, anyhow, enable the chief conductor to adjust the maximum of brake action attainable with the automatic brake control at any desired time, for instance corresponding to the state of the rails at the time being (moisture, covering with ice). In order to provide also for such an adjustment, the control of the pressure medium (for instance compressed air) operating the brakes is effected, according to my invention, by the co-operation of two controlling members, of which the one, as regards its position, depends upon the position of a brake part which takes up the brake power and is elastically supported. This member is termed "torque meter" in the following part of this specification and in the claims. The position of the other controlling member is determined by an adjustment of the main switch to be actuated by the chief conductor, in such a manner, that the maximum value of the brake action can be adjusted from the cabin of the chief conductor at liberty corresponding to the varying conditions (wetness, covering with ice) without any detrimental influence upon the automatic regulation.

My invention is illustrated by way of example on the accompanying drawings, on which Fig. 1 is an embodiment of a railway carriage brake according to the invention in axial section through the lower half of the brake, Fig. 2 is a sectional detail view showing the relative positions of the pressure appliances A and B, said section being taken at right angles to the axis of rotation of wheel 1 in Fig. 1.

Fig. 3 is a diagrammatic view of the control device showing the brakes in released position.

Figure 5 is a diagrammatic view of the device showing in detail the connection between the brake and control appliance H.

Fig. 6 is a sectional view taken along the line 6—6 in Fig. 5.

Figure 1:
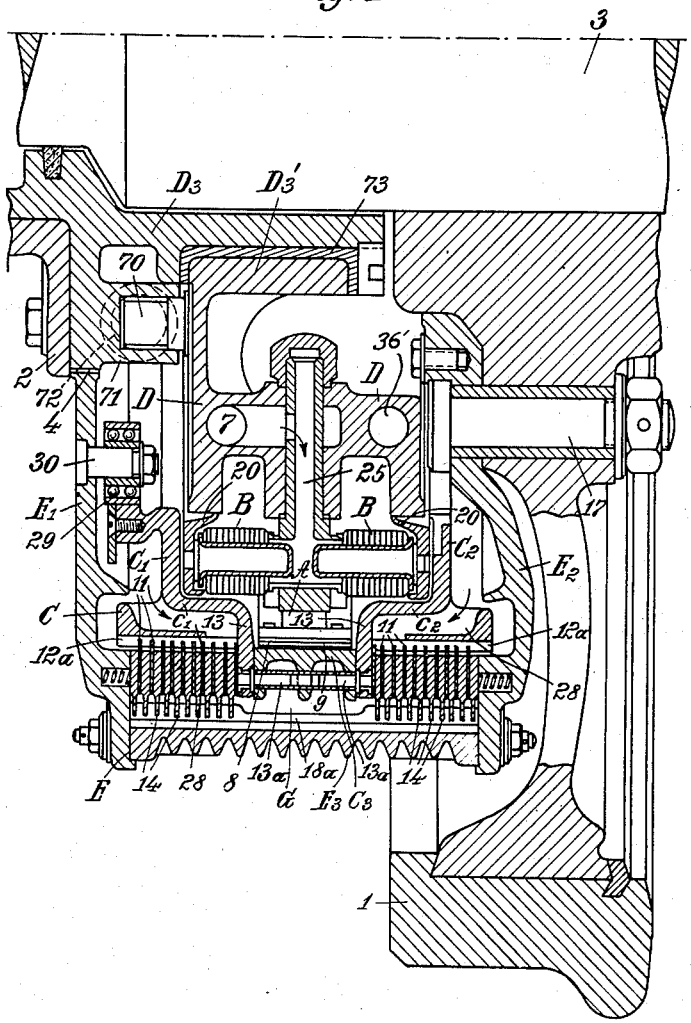

In the drawings, 1 denotes the wheel of a railway vehicle, 2 denotes a member rigidly connected with the axle bearing or with the underframe of the vehicle, and denotes the axle.

As may be seen from Figure 1 there is secured to the wheel 1, by the aid of massive bolts 17, an annular hollow body which is denoted as a whole by E, and which is composed of three parts, namely the substantially disc-shaped end parts $E_1$, $E_2$, and an annular part $E_3$ connecting them with one another. These three parts form together an annular casing, which is closed, except for an annular gap 4 between the inner periphery of the disc portion $E_1$ and the hub $D'_3$. An annular body D is so connected with the part 2 of the axle bearing in a manner hereinafter described as to be rotatable only within certain limits. The body $E_3$ forms the carrier of one group 14 of friction discs. The discs 14, which are arranged alternately with discs 11 in two packets separate from one another, are guided by ribs or ledges 18a, projecting from the internal surface of the middle part $E_3$ and extending in an axial direction, the discs 11 being guided upon similar ribs or ledges 12a, which project outwards from the second disc carrier C. Carrier C will hereinafter be referred to as the loose carrier, and is rotatable without limit both in relation to the wheel 1 and its axle and in relation to the axle bearing 2, and therefore in relation to the vehicle underframe. The loose carrier C may be supported by the aid of running rollers 29 distributed around its periphery, on the outer or fixed disc-shaped portion E' of housing E, and the running rollers 29 supporting the carrier C being mounted by means of ball bearings on studs 30 fixed on the disc-shaped part $E_1$ of the carrier E so as to extend axially inwards.

The loose carrier, denoted as a whole by the reference C, is likewise composed of a central annular portion $C_3$ and two side members $C_1$ and $C_2$. The lastnamed parts, which also comprise the ledges of ribs 12a for guiding the discs 11, are of stepped cross section, which is symmetrical about a central plane at right angles to the axle 3, and are guided on the central part $C_3$ by their outer flange members 13 by the aid of bolts 13a, in such a way that they can slide axially in relation to the latter but cannot rotate. Alongside the flange portions $C_1$, $C_2$ of the loose carrier C are located pressure appliances B, which effect the compression of the packets of discs in an axial direction through the medium of discs 20, flange portions $C_1$, $C_2$, $c_1c_2$, and 13, 13. The pressure appliances B are distributed in pairs opposite to one another over the periphery of the annular body D connected with the axle bearing 2. (Figs. 1 and 2.) They consist of hollow cylindrical bellows of thin sheet metal, the interiors of which communicate by a common pipe 25 with a supply 7 for the pressure fluid, for instance compressed air. The bellows B do not act directly upon the flange members $C_1$, $C_2$ but through the medium of annular discs 20, which discs are so guided, by the aid of bolts 20a (Fig. 2) mounted on the carrying body D and extending in an axial direction, that they can slide axially but cannot rotate relatively to the carrying body D.

Upon the periphery of the carrying body D are arranged pressure appliances A, which consist of pistons 96 (Fig. 2) operating in cylinders 95 communicating with the pressure medium, for instance compressed air through pipes 36.

The pistons are urged towards the axle by means of springs 97. At the free end of the piston rod 98, a wedge 99 is provided which passes between two projections 100, 100 having correspondingly inclined surfaces on the brake blocks 8, 8 which are in the form of annular sectors. These brake blocks are provided with friction pieces 9, 9, also in the form of annular sectors. When the pistons 96 are forced outwardly in the direction of the arrow by the introduction of pressure medium into the cylinders 95, thereby expanding the brake blocks 8, the friction pieces come into frictional engagement with co-operating friction surfaces on an annular central part $C_3$ of the loose disc carrier C, whereby the braking of the loose disc carrier is effected. If the connection of the cylinders 95 with the source of pressure medium is interrupted and the pipes 36 placed into communication with the atmosphere, then the springs 97 force the pistons 96 back into their initial position, the brake blocks being retracted through the intermediary of pins 37 which pass through the wedges 99 which bear against projections 38 on lugs provided on the brake blocks.

The braking of the loose carrier is effected shortly before the pressure appliances formed by the bellows B come into operation for the compression of the packets of friction discs, and independently of the latter. For this purpose the compressed air ducts 36' and 7 leading to the pressure appliances A and to the pressure appliances B respectively lead independently of one another through the carrying body D. Only the pressure appliances B are shown in connection with the present control appliance H.

As has already been indicated above, in describing the construction according to Figure 1, that the annular body D is rotatable to a certain limited extent relatively to the axle bearing member 2. This is rendered possible by the fact that the part $D'_3$ of the hub is supported for instance by means of a bronze bush 73 upon the sleeve member $D_3$, said hub being provided with pins 70 projecting axially and distributed round the hub periphery. These pins 70 alternate with a corresponding number of stops 71, which stops are distributed round the periphery of the flange 2a extending from $D_3$ and bolted to the axle bearing member 2. Between each pin 70 and the adjacent stop 71 is interposed, as indicated in a more diagrammatic manner by Figure 3, a helical spring 72. These springs oppose a resilient resistance to a rotation of the part $D'_3$ of the carrying body in relation to the part $D_3$ connected with the axle bearing, and ultimately restrict such rotation definitely when they are fully compressed.

At one place on the periphery there is provided, between two outwardly extending arms 74 and 75 connected on the one hand with the body $D'_3$ and on the other hand with the body $D_3$, a pressure appliance F consisting of spring sheet metal bellows, the hollow interior of which is in communication by a flexible pipe 76 with a controlling appliance H mounted on the underframe of the car.

One arm 74 (Fig. 5) comprises a stud screwed into the annular body D and passing through an arcuate slot 74' in the bearing part 2 and through an arcuate slot 74d in the stop 71 adjacent thereto. This stud at its outer part forms an abutment for a pressure device F (Figs. 3 and 4) which consists of a resilient sheet metal bellows, the other abutment of which is formed by the arm 75 rigidly connected to the body $D_3$.

The controlling appliance consists essentially of a three-stage cylinder member 77, in which there work two piston valves, namely an outer annular piston 78 and an inner piston 79. The latter is subject to the action of a bellows 80, which is connected with the pipe 76, and which, when it expands owing to a rise of fluid pressure in the pipe 76 caused by compression of the bellows F (Fig. 3), presses the piston 79 downwards against the action of a spring 81, which urges it upwards. The piston 78 is subject on one side to the action of bellows 82, the interior of which communicates by a pipe 84 with the brake valve on the driver's control board, and on the other side to the action of a spring 85, which tends to move the piston in the opposite direction.

Two bores 78a and 78b of the piston 78 are connected to flexible pipes 91 and 86 respectively, of which the latter comes from the source of compressed air, while the pipe 91 leads to the bellows B of the brake, which effect the axial compression of the packets of discs. The pipes 86 and 91 pass freely through elongated holes 90 provided in the wall of the cylinder 77. The inner piston 79 is provided with a transverse bore 87, which is of greater diameter than the bores 78a and 78b located opposite to it in the outer piston 78. The piston 79 also has a bore 89, the axially directed portion of which opens freely into the interior of the cylinder 77, which in its turn communicates through openings 77a with the atmosphere. Actually, 78 is a piston, which however is acting as a piston merely with its restricted main portion. The lower narrow flange portion does not act as a piston, but instead it is acted on by the forces of the pressure exerted on the bellows 82. The flange portion is not tightly fitted in the corresponding enlarged portion of the cylinder 77. An annular gap is left which establishes a connection between the lower chamber of the enlarged cylinder portion which in turn is connected with the bore 89, and the upper chamber which is connected with the atmosphere by means of the bores 77a. This gap is clearly indicated in the Figures 3 and 4. The horizontal portion 89a of this bore opens in the peripheral surface of the piston. It may register in a definite relative position of the pistons 78 and 79 with the horizontal portion 88a of a bore provided in the piston 78, this bore terminating in the bore 78a or in the pipe 91 connected thereto. The pipe 91 is flexible and is attached to a hollow projection 7a forming a continuation of the supply conduit 7 and passing through an arcuate slot 71c in the bearing part 2 and a corresponding arcuate slot 71d in the stop 71 adjacent thereto, the said slots being of sufficient length to permit the requisite amount of relative movement between the parts D and D₃.

The operation is as follows: In the position of the members illustrated in Fig. 3, the engineer's brake valve L establishes the free connection between the bellows 82 acting on the annular slide 78 with the source S of compressed-air by means of the pipe 84. The annular slide 78 is in its upper end position. The pressure devices B effecting the actuation of the brake are then cut off from the source of compressed-air, since the connection between the cooperating pipes 86, 91 is interrupted by the control piston 79. The devices B are connected to the outer air by the pipes 91, 88, and 89, as well as the opening 77a and the brakes are released.

Figure 4:
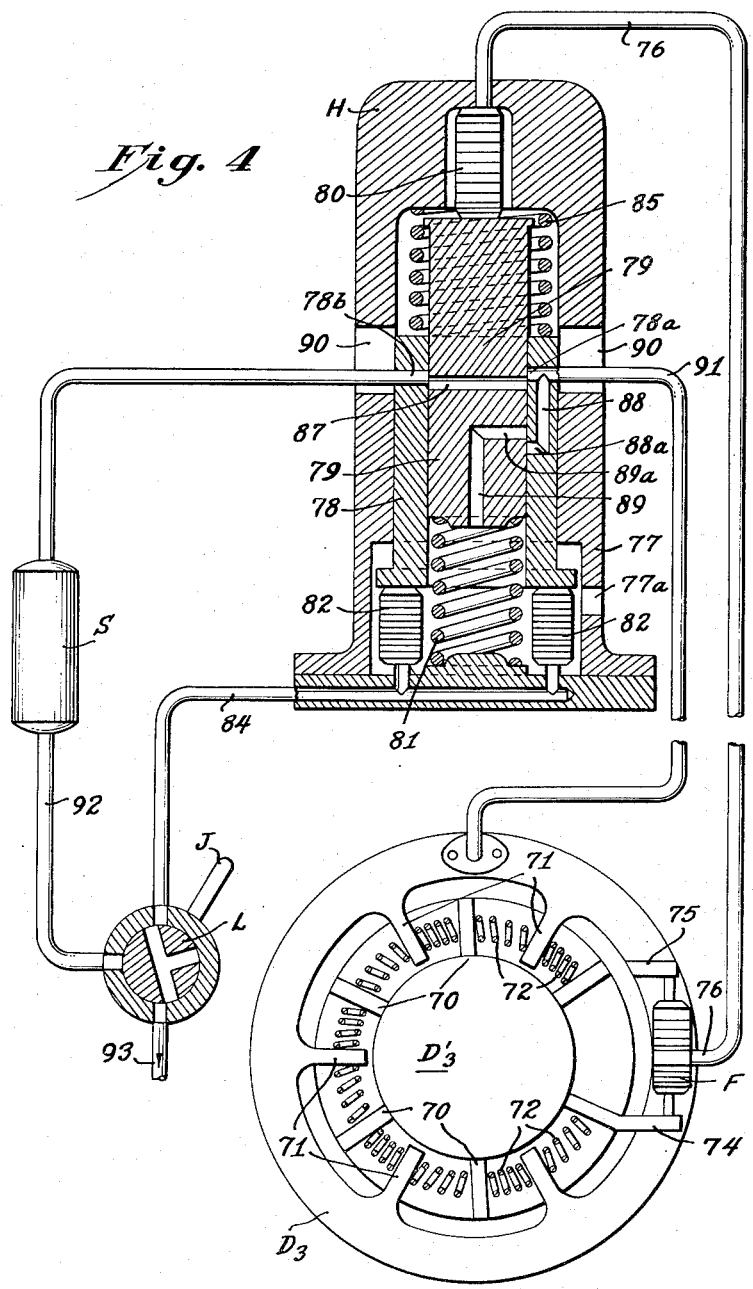
Figure 4 is a view similar to Figure 3 showing the position of the parts during the initial application of the brakes.

When the brakes are to be applied, the brake valve L is turned slowly in clockwise direction into the position shown in Fig. 4. Thereby, the bellows 82 are cut off from the source S of compressed-air in the beginning of the operation, and are thereafter connected to the outer air. As a result of this, the pressure of spring 85 acting on the annular slide 78 exceeds the pressure of the bellows 82; consequently, the slide 78 is moved downwardly, and the connection of the pressure devices B of the brake with the outer air will be interrupted at 89a. In the meantime, the spring 85 has pushed down further the annular slide 78, because the pressure in the bellows 82 has been further reduced. As a result of this, the connection between the pipes 86 and 91 and thereby communication between the source of compressed-air and the pressure devices B of the brake is established, so that the braking operation is initiated. Consequently, the brake member D′₃ is turned to a small extent opposing the pressure action of the springs 72, whereby the arm 74 presses on the bellows F. The pressure of the fluid contained in the bellows F is transferred to the bellows 80 of the control device H by means of the pipe 76, and said bellows pushes the piston 79 downwardly, opposing the action of its spring 81. In the position of the members, as shown in Fig. 4, no change in the braking operation takes place, because in the meantime the annular slide 78 is also further moved downwards by its spring 85. If, however, for any reason the braking action is intensified and thereby the rotation of the brake member D′₃ advanced, the bellows 82 may be again cut off from the outer air by the backward rotation of the engineer's brake valve L. The bellows F is further compressed by the arm 74, and consequently, the piston 79 is urged further downwards, whereby first the connection between the pressure devices B of the brake and the sources of compressed-air is again interrupted and after further downward movement of the piston slide 79, the connection between the pressure devices and the outer air is again established at 89a. As a result of the latter connection the pressure acting on the brake lamellas is decreased, as long as the brake member D′₃ is backwardly rotated due to the decrease of turning momentum cooperating with the pressure, so that the pressure of the arm 74 on the cooperating bellows F ceases and the piston 79 is again moved upwardly by its spring 81. As a result of this upward movement, first the connection between pressure devices B and the outer air is interrupted, and thereafter the connection with the source S of compressed-air is again established. The braking action therefore increases again. This series of operations is repeated until the piston 79 finally comes to rest in an intermediate position. This automatic regulating of the braking torque is independent of the adjustment of the braking action on the part of the train driver, since it occurs in any position of the intermediate piston 78 by which the desired braking action in itself is conditioned. The driver therefore need only adjust the braking action that he considers necessary for the purpose of bringing the train to a standstill at a definite point on the brake lever manipulated by him, which co-operates with a scale of braking action. In each of these adjustments the automatic adaptation of the braking effect concerned to the changing frictional conditions can then take place.

It may be observed that the rotation, occurring when the torque increases, which is utilized for the automatic regulating of the pressure acting upon the packets of friction discs, need not necessarily take place between the members D₃ and D′₃.

Of course the brake devices illustrated, as such, may also be employed for other purposes, particularly where the braking of large and rapidly moving masses is important, as for instance in the case of heavy high-speed vehicles.

What I claim is:

1. In a brake arrangement for controlling the braking effect of railway fluid pressure brakes and the like independently of the variable frictional value of the brake faces, a brake, fluid-pressure actuated means adapted to operate said brake, a pair of movable ported members conjointly operable and having coincidable ports for controlling the admission of said fluid pressure to the brake, the movement of one of said members being responsive to the brake torque and a second fluid-pressure means including a valve for adjusting the position of the other of said members relative to said first member.

2. In a brake arrangement according to claim 1 in which a second pair of coincidable ports are respectively provided in said movable members for exhausting the fluid pressure from said brake when the brake torque exceeds a predetermined limit set by said second fluid-pressure means.

3. In a brake arrangement for controlling the braking effect of railway fluid pressure brakes and the like independently of the variable frictional value of the brake faces, a brake, an axle housing, an annular member oscillatably supported by said housing and axially movable of the latter to press one of said brake faces into engagement with the other, fluid-pressure actuated means adapted to axially press said annular member to thereby press said first brake face, a movable member having means for admitting said fluid pressure into said actuated means, a second fluid-pressure actuated means responsive to the oscillation of said annular member for actuating said movable member, means independent of said second fluid-pressure actuated means for yieldingly holding said annular member in normal position relative to its axis of oscillation, a second fluid-pressure actuated member movable relative to said first member for varying the time during which said fluid-pressure is admitted to said actuated means by said first movable member, and control means including a valve for adjusting the position of said second member relative to said first member.

4. In a brake arrangement according to claim 3 in which said movable members are slidably mounted one upon the other and are provided with a pair of coincidable ports respectively to provide a passageway for the fluid to be admitted to the brake.

5. In a brake arrangement for controlling the braking effect of railway fluid-pressure brakes and the like independently of the variable frictional value of the brake faces, a brake, an axle housing, an annular member oscillatably supported by said housing and axially movable of the latter to press one of said brake faces into engagement with the other, a fluid-pressure actuated means adapted to axially press said annular member to thereby press said first brake face, a movable ported member for controlling the admission of said fluid pressure into said actuated means, a second fluid-pressure means responsive to the oscillatory movement of said annular member for actuating said movable member, spring means independent of said second fluid pressure means for yieldingly resisting oscillation of said annular member in either direction from a normal position, and a second movable member actuated by fluid pressure and adjustable relative to said movable member for varying the time during which said fluid pressure is admitted to said first-named actuated means by said first movable member, said second movable member having a port therein adapted to coincide with the port in said first movable member to provide a passageway for the fluid to be admitted to said first fluid pressure means.

HANS KATTWINKEL.

REFERENCES CITED

The following references are of record in the file of this patent:

UNITED STATES PATENTS

| Number | Name | Date |
|---|---|---|
| 2,239,459 | Kattwinkel | Apr. 22, 1941 |
| 2,014,903 | Logan | Sept. 17, 1935 |
| 2,096,433 | Logan | Oct. 19, 1937 |
| 2,226,557 | Eksergian | Dec. 31, 1940 |
| 2,242,854 | Flowers | May 20, 1941 |
| 2,243,449 | Aikman | May 27, 1941 |